Nov. 6, 1934.     E. T. HARBAUGH     1,979,384
APPARATUS FOR BLANCHING NUTS
Filed Jan. 28, 1932     2 Sheets-Sheet 1
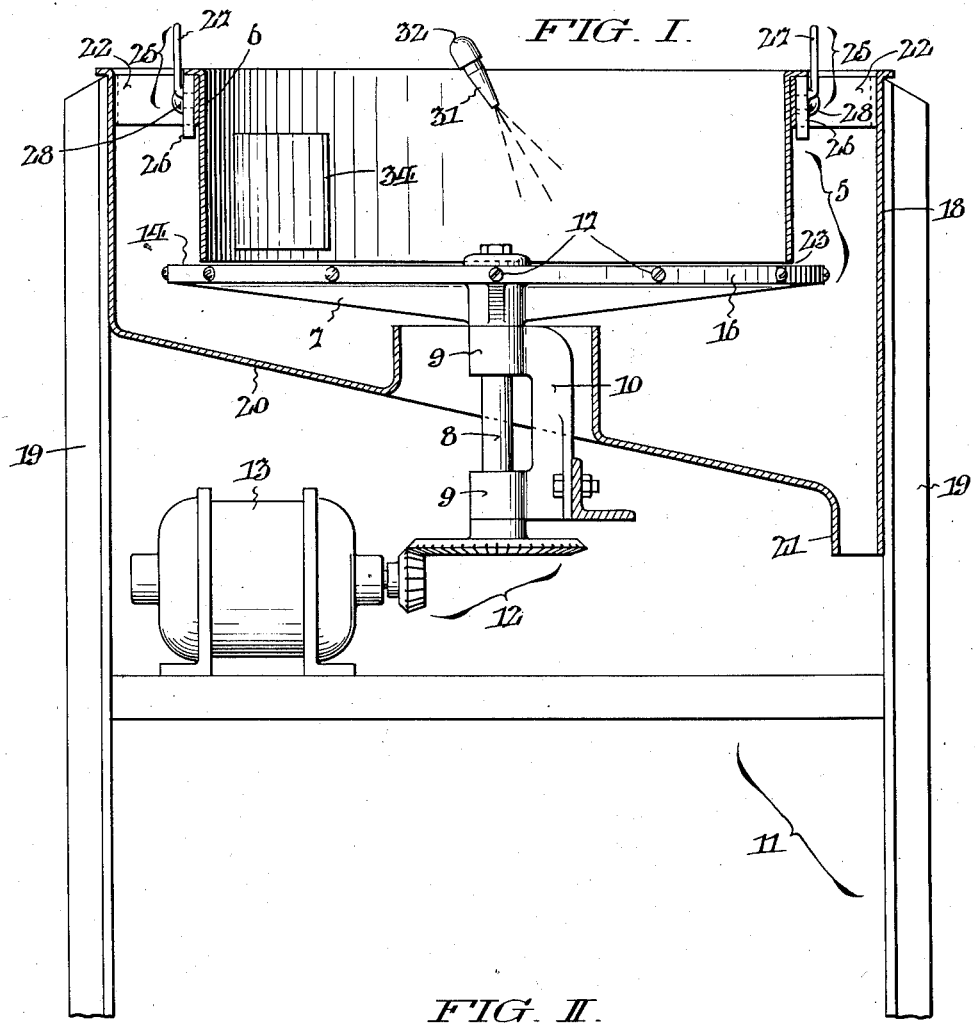
FIG. I.
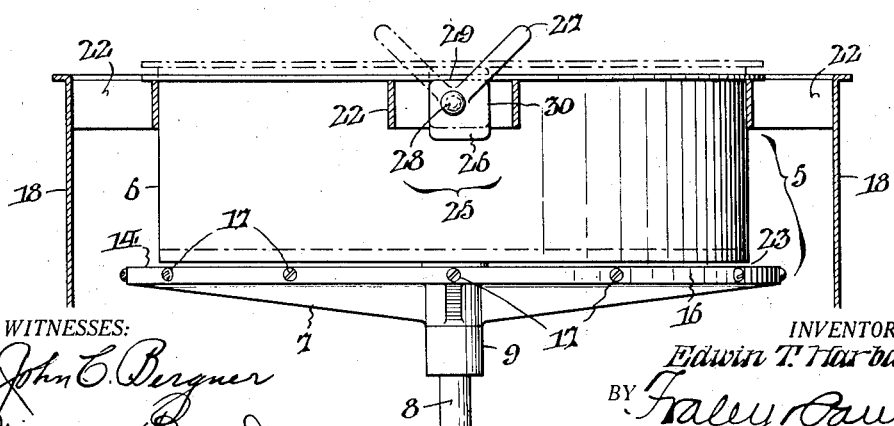
FIG. II.

Nov. 6, 1934.  E. T. HARBAUGH  1,979,384
APPARATUS FOR BLANCHING NUTS
Filed Jan. 28, 1932  2 Sheets-Sheet 2
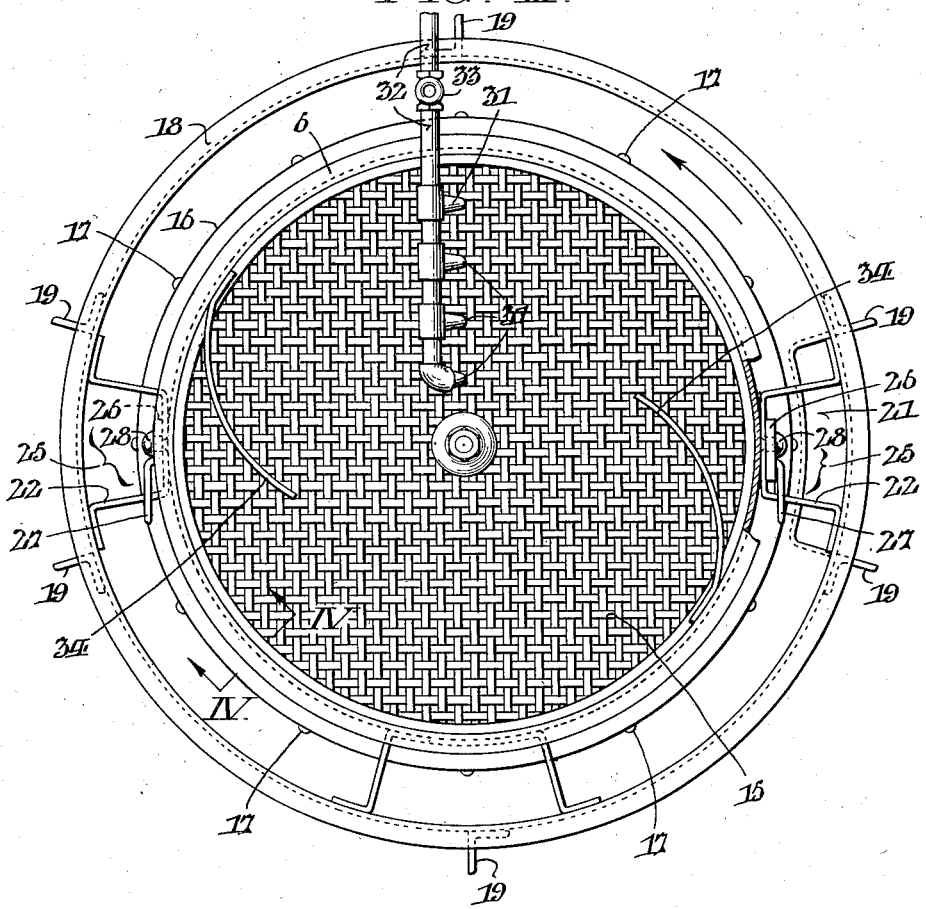
INVENTOR:
Edwin T. Harbaugh,
BY
ATTORNEYS.

Patented Nov. 6, 1934

1,979,384

UNITED STATES PATENT OFFICE 1,979,384

APPARATUS FOR BLANCHING NUTS

Edwin T. Harbaugh, Camden, N. J.

Application January 28, 1932, Serial No. 589,331

10 Claims. (Cl. 146—32)

This invention is concerned with blanching peanuts and the like in their raw state in preparation for cooking them in hot oil or grease; and it relates to apparatus for the indicated purpose.

Due to the inherent tenacity of the skins or hulls to cling to the kernels of peanuts in the raw state, they are naturally difficult of detachment. Various methods have been heretofore resorted to to accomplish the removal of hulls from raw nut kernels, the most generally practiced methods involving pre-roasting of the kernels, or pretreating them for a time with scalding water to soften the hulls. After such pre-treatment the peanut kernels were subjected to an abrading operation to effect the removal of the hulls. The first of these methods which involves pre-roasting, is objectionable in that it impairs the flavor of the nuts; while under the second or scalding method, the hulls are not sufficiently loosened to render their removal possible without subjection to a protracted and severe abrading operation with resultant separation of the component halves of the kernels and creation of the objectionable "flats". In still another method heretofore employed, the removal of the hulls was effected by an abrading operation upon the raw kernels without pre-treatment. Here again, however, the abrading action had to be prolonged to such an extent as to result in division of the kernel components and in wearing away of considerable of the nut meat.

My invention has for its chief object to overcome the various difficulties to which attention has been directed; and this desideratum I attain, by first treating the raw kernels with scalding water, as heretofore, in order to expand the kernels and soften the hulls; immediately thereupon treating the kernels with cold water to effect their contraction, with attendant loosening and shrivelling of the hulls; and finally subjecting the kernels to a gentle abrading action incident to which the loosened and shrivelled hulls are easily removed without injury to the kernels and without entailing splitting of them into an excessive number of flats.

In connection with blanching apparatus of a type wherein a holding receptacle for a mass of nut kernels is formed jointly by a stationary cylindric wall and a rotating abrading bottom, it is an aim of my invention to provide a replaceable abrading surfacing for the said bottom which will be gentle in its action incident to removing the hulls, with consequent assurance against subdivision of, or damage to the kernels.

Another object of my invention is to provide for tangential projection into the receptacle in a direction opposite to that of rotation of the abrading receptacle bottom, a continuous spray of the cold water which is relied upon to shrivel the hulls of the mass of the kernels undergoing blanching in the apparatus.

Still another object of my invention is to provide baffle means, which, concurrently with the spraying of the kernels and during the operation of the apparatus, will continuously agitate the gyrating mass of the kernels with predetermination of an ever changing lower strata of said kernels for contact with the abrading surface of the rotating receptacle bottom.

A further object of my invention is to render the side wall of the receptacle regulatable up and down relative to the rotating receptacle bottom with consequent variation in the height of a circumferential interval between the lower edge of said wall and the top surface of the receptacle bottom, to determine, on the one hand, a very narrow space, which, during the normal operation of the apparatus, will permit passage only of the wash of water and released hulls under centrifugal action, and on the other hand, a larger space which will permit passage of the nut kernals for ejection from the apparatus at the completion of blanching operation.

Other objects and attendant advantages of this invention will be manifest from the following detailed description considered in connection with the accompanying drawings, wherein Fig. I shows a vertical sectional view of an apparatus embodying the present improvements.

Fig. II is a fragmentary view of the apparatus with portions thereof in elevation and others in section at right angles to the plane of Fig. I.

Fig. III is a plan view of the apparatus; and,

Fig. IV is a view, drawn to an enlarged scale and taken as indicated by the arrows IV—IV in Fig. III, showing an important detail of construction.

With more specific reference to these illustrations, my improved nut blanching apparatus comprises a receptacle 5 which is formed jointly by a stationary cylindric smooth and imperforate side wall 6, and a rotating discous bottom 7. As shown in Fig. I, the receptacle bottom 7 is secured to the upper end of a vertical shaft 8 with journal support in bearings 9 of a bracket 10 which is suitably supported within the frame 11 of the apparatus beneath the receptacle 5. Incident to operation of the apparatus, the receptacle bottom 7 is continuously rotated by power derived through a speed reducing bevel gear couple 12, from an electric motor 13 also mounted within the frame 11 beneath the receptacle 5. The receptacle bottom 7, it will be noted, is somewhat larger in diameter than the cylindric wall 6 with resultant provision of a circumferential ledge 14 exteriorly of said receptacle wall. As shown in Figs. III and IV the top surface of the receptacle bottom 7 is covered with a coarsely woven mesh or fabric 15 preferably of a relatively tough non-metallic material like rattan for example, such covering being stretched over said bottom and clamped in place by a band 16 which is removably secured by means of screws shown at 17.

From Figs. I–III it will be observed that the receptacle 5 is surounded by a cylindric casing 18 which is sustained atop the uprights or leg members 19 of the frame 11, and which has a sloping drain bottom 20 leading to a discharge spout 21 at one side of the apparatus. Projecting inwardly from the casing 18 at circumferentially spaced intervals, are brackets 22 which sustain the cylindric wall 6 of the receptacle 5 with provision of a narrow vertical interval 23 between the lower edge of said wall and the top surface of the angle section clamp band 16 by which the rattan 15 is secured to the receptacle bottom 7. As shown, the horizontal flange of the band 16 is quite broad to underreach the lower edge of the receptacle wall 6 and to insure against wear thereby of the rattan covering 15 of the receptacle bottom 7.

For the purpose of raising and lowering the receptacle wall 6 to adjust the height of the interval 23, I have incorporated with a diametrically opposite pair of the brackets 22, lifting devices which are designated comprehensively by the numerals 25. Each of these lifting devices 25 comprises a cam block 26 which is rotatable, by means of a handle 27, about a stud 28 let into the corresponding bracket 22. As shown in Fig. II, the cam block 26 affords straight edges 29 and 30 at different radial distances from the pivot center 28. Thus, by swinging of the handles 27 of the devices 25 counter-clockwise through an angle of 45° in Fig. II, the cylindric side wall 6 of the receptacle 5 is lifted to the elevation indicated in dot-and-dash lines.

During the blanching treatment, a series of nozzles 31 in a jet pipe 32 direct a spray of cold water tangentially into the receptacle 5 at an inclination counter to the direction of the rotation of the receptacle bottom 7 as shown in Figs. I and III, said spray being controllable by a hand valve 33.

Projecting inwardly from the side wall 6 of the receptacle 5 are curved baffles 34 whereof the exact function will be presently explained in full.

In practicing my invention, I first place a batch of raw peanut kernels in a suitable vessel (not illustrated) containing scalding water. After immersion for a sufficient length of time in the scalding water to insure softening of the hulls, I transfer the batch of kernels immediately to the receptacle 5 of the blanching apparatus, turn on the valve 33 for release of the cold water through the spray pipe 32, and set the apparatus in motion. Directly, the mass of nut kernels begins gyrating within the receptacle 5 under centrifugal action induced by the rotating bottom 7, the speed of the mass being however considerably less than that of said bottom due to the inertia of its weight and the restraining action of the baffles 34. By virtue of their curvature, the baffles 34 oppose the centrifugal action, so that the nut kernels are continuously directed inwardly from the wall 6 toward the center of the receptacle 5. A rolling or wave motion is thus set up with determination of an ever changing lower strata of the nut kernels for contact with the abrading surface 15 of the rotating receptacle bottom 7. Through being discharged from the jet pipe 32 tangentially at an angle contrary to the movement of the gyrating mass, the cold water spray effectively chills the nut kernels, causing them to contract and their hulls to shrivel and loosen for easy removal by subsequent abrasion with the rattan covering 15 of the receptacle bottom 7. Now since the surface of the covering 15 is devoid of sharp edges, and the crossed strands of the rattan are, for the most part, tangential to the center of rotation of the receptacle bottom 7, the abrading action is obviously very gentle. Accordingly, the removal of the preloosened hulls is accomplished in a very short space of time without injury to, or separation of the kernels, and a maximum yield of blanched whole nuts is thereby assured in readiness for subsequent cooking or frying in grease or oil.

During the hull removing process, the receptacle wall 6 is of course maintained in the lowered position shown in full lines in Figs. I and II of the drawings, when the circumferential interval 23 is just large enough for passage of the wash of the spray water carrying the removed hulls. In issuing from the interval 23, the wash overflows the circumferential ledge 14, and is finally thrown off by the rapid rotation of the receptacle bottom 7, into the casing 18 and drained from the latter through the spout 21.

Upon completion of the blanching operation the handles 27 of the lifting devices 25 are thrown to raise the receptacle wall 6 to the dot-and-dash line position of Fig. II. The height of the circumferential interval 23 is thereby increased for passage of the blanched nut kernels, which latter are ejected, by flushing action of the water sprayed from the pipe 32, from the receptacle 5 into the casing 18 by continued rotation of the bottom 7 for a short time, and collected in a suitable receiver (not shown) placed beneath the spout 21.

Having thus described my invention, I claim:

1. In apparatus for blanching peanuts and the like, a receptacle for holding a mass of nut kernels, having a stationary cylindric and imperforate wall, and a rotating bottom surfaced with woven rattan devoid of sharp edges, said bottom being vertically spaced relative to the lower edge of the receptacle wall to provide a narrow circumferential interval for escape of the hulls removed from the kernels by the abrading action of said rotating bottom.

2. In apparatus for blanching peanuts and the like, a receptacle for holding a mass of nut kernels, having a stationary cylindric wall, and a rotating bottom surfaced with woven rattan and vertically spaced relative to the lower edge of the receptacle wall to provide a narrow circumferential interval for escape of the hulls removed from the kernels by the abrading action, the said rattan covering being stretched over the rotating receptacle bottom and secured by a removable clamp band secured over said bottom.

3. In apparatus for blanching peanuts and the like, a receptacle for holding a mass of nut kernels, having a stationary cylindric and imperforate wall and a rotary woven non-metallic abrading bottom of larger diameter and devoid of sharp edges, vertically spaced relative to the lower edge of the receptacle wall with provision of a narrow circumferential interval for escape of the hulls removed from the nut kernels by abrading action, and with provision of a peripheral ledge externally of the receptacle wall.

4. In apparatus for blanching peanuts and the like, a receptacle for holding a mass of nut kernels, having a stationary cylindric and imperforate wall, and a rotary coarsely-woven rattan abrading bottom devoid of sharp edges vertically spaced relative to the lower edge of the receptacle wall to provide a narrow circumferential interval for escape of the hulls removed from the peanuts by abrading action; and means whereby the receptacle wall and its rotating bottom may be adjusted relatively to vary the size of the vertical interval between them.

5. In apparatus for blanching peanuts and the like, a receptacle for holding a mass of nut kernels, having a stationary cylindric and imperforate wall, and a rotary coarsely-woven rattan abrading bottom devoid of sharp edges vertically spaced relative to the lower edge of the vertical receptacle wall to provide a narrow circumferential interval for escape of the hulls removed from the nut kernels by abrading action; and means whereby the receptacle wall may be adjusted up and down relative to the rotating receptacle bottom to vary the height of the aforesaid interval.

6. In apparatus for blanching peanuts and the like, a receptacle for holding a mass of nut kernels, having a stationary cylindric and imperforate wall, and a rotating abrading bottom devoid of sharp edges vertically spaced relative to the lower edge of the receptacle wall to provide a narrow circumferential interval for escape of the hulls removed from the peanut kernels by abrading action; and a number of rotary cam devices disposed at intervals around the receptacle wall, said devices embodying straight edges at different radial distances from their respective pivot centers, whereby said wall may be raised and lowered relative to the receptacle bottom to vary the height of the interval aforesaid.

7. In apparatus for blanching peanuts and the like, a receptacle for holding a mass of nut kernels, having a stationary cylindric and imperforate wall, and a rotary woven non-metallic abrading bottom devoid of sharp edges vertically spaced relative to the lower edge of the receptacle wall to provide a narrow circumferential interval for escape of the hulls removed from the peanut kernels by abrading action; and a casing surrounding the receptacle to catch the removed hulls.

8. In apparatus for blanching peanuts and the like, a receptacle for holding a mass of peanut kernels, having a stationary cylindric and imperforate wall, and a rotary coarsely-woven non-metallic abrading bottom devoid of sharp edges vertically spaced relative to the lower edge of the receptacle wall, with provision of a narrow interval therebeneath; a jet pipe having a series of nozzles for discharging wash water tangentially into the receptacle for ejection of the hulls, removed from the peanuts by abrading action through the narrow circumferential interval aforesaid; and a casing surrounding the receptacle to catch the wash water and the removed hulls.

9. In apparatus for blanching peanuts and the like, a receptacle for holding a mass of nut kernels, having a stationary cylindric and imperforate wall, and a rotary coarsely-woven non-metallic abrading bottom devoid of sharp edges vertically spaced relative to the lower edge of the receptacle wall with provision of a narrow circumferential interval therebeneath; a jet pipe having a series of nozzles projecting a spray of wash water tangentially into the receptacle in a direction opposite to that of the rotation of the receptacle bottom; and a casing surrounding the receptacle to catch the wash water and the removed hulls discharged through the narrow interval aforesaid.

10. In apparatus for blanching peanuts and the like, a receptacle having a stationary cylindric and imperforate wall, and a rotating coarsely-woven rattan abrading bottom devoid of sharp edges vertically spaced relative to the lower edge of the receptacle wall with provision of a narrow circumferential interval for escape of the hulls removed from the peanut kernels by abrading action; and curved smooth baffle plates projecting arcuately-inward from the receptacle wall to maintain the peanuts in a state of continual turbulence incident to the operation of the apparatus.

EDWIN T. HARBAUGH.